US007121756B2

(12) United States Patent
Wright et al.

(10) Patent No.: US 7,121,756 B2
(45) Date of Patent: Oct. 17, 2006

(54) AUDIO DEVICE POST EXTENSION AND ANGLING SYSTEM

(75) Inventors: Doug S. Wright, Simi Valley, CA (US); Vance Dickason, West Linn, OR (US)

(73) Assignee: Conextion Systems, Inc., Simi Valley, CA (US)

( * ) Notice: Subject to any disclaimer, the term of this patent is extended or adjusted under 35 U.S.C. 154(b) by 0 days.

(21) Appl. No.: 10/885,861

(22) Filed: Jul. 7, 2004

(65) Prior Publication Data

US 2005/0047850 A1 Mar. 3, 2005

Related U.S. Application Data

(60) Provisional application No. 60/497,752, filed on Aug. 26, 2003.

(51) Int. Cl.
*F16C 11/06* (2006.01)

(52) U.S. Cl. ...................................................... 403/128

(58) Field of Classification Search ................ 403/128, 403/90, 109.1–109.3, 109.8, 122, 137, 141, 403/142, 148, 329; 381/386, 387, 395
See application file for complete search history.

(56) References Cited

U.S. PATENT DOCUMENTS

| | | | | |
|---|---|---|---|---|
| 3,776,649 | A * | 12/1973 | Kemezys | 403/90 |
| 4,678,572 | A * | 7/1987 | Hehl | 210/232 |
| 5,859,917 | A * | 1/1999 | Silber et al. | 381/389 |
| 6,002,780 | A * | 12/1999 | Espiritu | 381/182 |
| 6,413,004 | B1 * | 7/2002 | Lin | 403/176 |
| 6,683,963 | B1 * | 1/2004 | Sterns et al. | 381/182 |
| 2002/0114660 | A1 * | 8/2002 | Burton | 403/122 |
| 2003/0044226 | A1 * | 3/2003 | Cloyd et al. | 403/122 |

* cited by examiner

*Primary Examiner*—Daniel P. Stodola
*Assistant Examiner*—Joshua T. Kennedy
(74) *Attorney, Agent, or Firm*—Loza & Loza LLP

(57) ABSTRACT

One embodiment of the invention provides a post extension system frame assembly for mounting fixtures within a recess in a wall or ceiling and that can be adjusted and installed with minimal time and effort. One feature of the invention provides a post extension and angling mechanism that can be manually installed and/or adjusted to set the depth, direction and angle of an audio device so as to be able to position the sound dispersion axis of the audio device (e.g., speaker, tweeter, woofer, audio transducer, etc.) directly towards a listener.

9 Claims, 9 Drawing Sheets

AUDIO DEVICE POST EXTENSION AND ANGLING SYSTEM

CROSS REFERENCE TO RELATED APPLICATIONS

This non-provisional United States (U.S.) Patent Application claims the benefit of provisional U.S. Patent Application No. 60/497,752, filed Aug. 26, 2003.

FIELD

Various embodiments of the invention pertains to in-wall audio devices. More particularly, at least one embodiment of the invention relates to an extendable post and angling system for mounting an audio tweeter within a wall or ceiling recess.

DESCRIPTION OF RELATED ART

Audio devices, such as speakers, woofers and/or tweeters, are often mounted within a wall or ceiling cavity or recess. Various types of frames and/or fasteners are used for the purpose of securing the audio devices within a wall or ceiling cavity.

Mounting such audio devices within a recessed cavity poses several problems. For instance, mounting an audio device inside a ceiling cavity may prevent the sound emitted from such device from directly reaching listeners. Adjusting a conventional mounting mechanism to position the audio device at the correct depth, direction, and angle may be burdensome or impossible. That is, it may not be possible to direct the sound dispersion axis of the recessed audio device to reach a listener directly. As a result sound quality may be affected.

When mounting a tweeter, for instance, the tweeter is typically fixedly secured in a mounting base. The mounting base may then be secured to a supporting mechanism within a ceiling cavity, for instance. However, conventional mounting mechanisms do not permit to easily adjust the position (e.g., depth, direction, and angle) of the tweeter.

Additionally, conventional mounting systems and fasteners are typically cumbersome and time-consuming to install, take many steps to mount, and require the use of several tools. This increases the cost of installation and deployment of, for instance, recessed speakers, lights, or exhaust fans.

DETAILED DESCRIPTION

In the following description numerous specific details are set forth in order to provide a thorough understanding of the invention. However, one skilled in the art would recognize that the invention may be practiced without these specific details. In other instances, well known methods, procedures, and/or components have not been described in detail so as not to unnecessarily obscure aspects of the invention.

In the following description, certain terminology is used to describe certain features of one or more embodiments of the invention. For instance, "fastener" and "retainer" are interchangeably used to refer to any type of securing mechanism. The term "audio device" is used to refer to any type of sound-generating device, including a speaker, loudspeaker, audio speaker, woofer, subwoofer, tweeter, and/or acoustic transducer. The term "manually" refers to a motion or task performed by hand and without the aid of a tool.

One embodiment of the invention provides a post extension and angling system for mounting fixtures/audio devices within a recess in a wall or ceiling and that can be adjusted and installed with minimal time and effort. One feature of the invention provides a post extension and angling mechanism that can be manually installed and/or adjusted to set the depth, direction and angle of a audio device so as to be able to position the sound dispersion axis of the audio device (e.g., speaker, tweeter, woofer, audio transducer, etc.) directly towards a listener.

According to one implementation of the invention, a method and system for extending the position of a ceiling-mounted tweeter to just below the ceiling surface is provided. Making the tweeter system extendable, in concert an angling system, enables the tweeter to be placed in a position that allows the listener to be directly on-axis with the tweeter, even when the listener is at an extreme angle to the speaker system. By making the tweeter system extendable, as opposed to being fixed in an extended position, the installer has the option of retaining a more conventional "flush" installation for those occasions when the installation is more aesthetically sensitive that acoustically sensitive.

Figure 1:
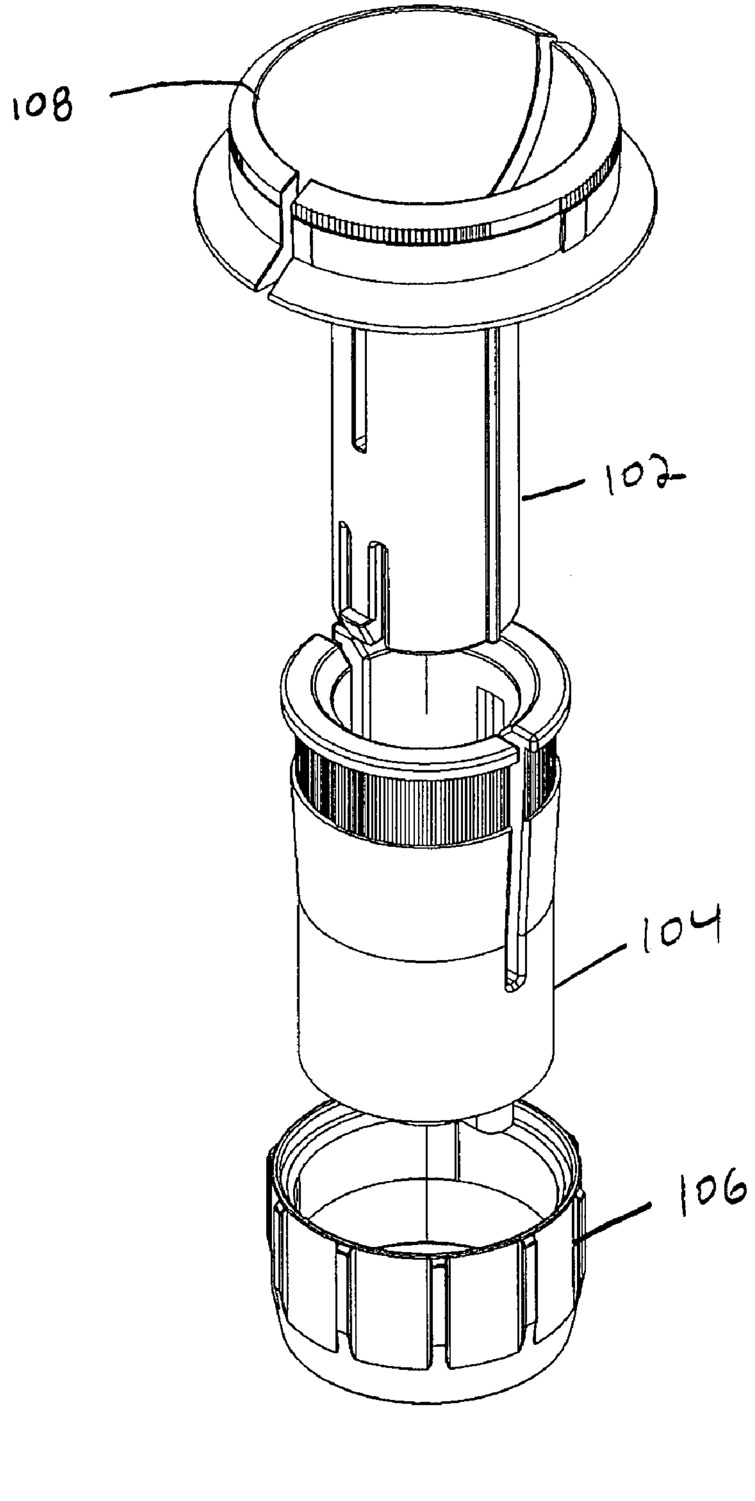
FIG. 1 illustrates an extension post mechanism according to one embodiment of the invention.

FIG. 1 illustrates an extension post mechanism 100 according to one embodiment of the invention. The extension post mechanism 100 includes an extendable inner post 102, an outer post sleeve 104, and a post lock ring 106. The extendable post 102 may include a mounting socket 108 which may serve as a mechanical interface between an angling system to mount a ball-joint mechanism for securing an audio device (e.g., tweeter). The extendable inner post 102 is sized to slide within the outer post sleeve 104. This permits an installer to set the depth of the audio device by adjusting the position of the telescoping or extendable inner post 102 relative to the outer post sleeve 104. The outer post sleeve 104 serves as the primary mechanical interface between the audio device (e.g., tweeter system) and the rest of the speaker system. The post lock ring 106 is sized to slide snuggly around the outer post sleeve 104 to lock the extendable inner post 102 in place.

The extendable inner post 102 and the outer post sleeve 104 may be configured in a piston/cylinder arrangement that enables the extendable inner post 102 to slide up and down inside the outer post sleeve 104. According to one embodiment of the invention, the amount by which the inner post 102 may extend depends on the length of the inner post 102 and/or outer post sleeve 104. For instance, in one implementation of the invention, the amount of travel allowed is sufficient to extend an audio device (e.g., tweeter) mounted on the mounting socket 108 just below the ceiling's surface (e.g., approximately one inch) and enable "direct-axis" sound propagation to a listener positioned at an angle to the speaker system. A small amount of extension minimizes the effect on ceiling aesthetics that a non-flush grille may have. That is, by minimizing the amount by which the audio device (e.g., tweeter) protrudes beyond the surface of the ceiling, the effect of a non-flush surface is minimized.

Figure 2:
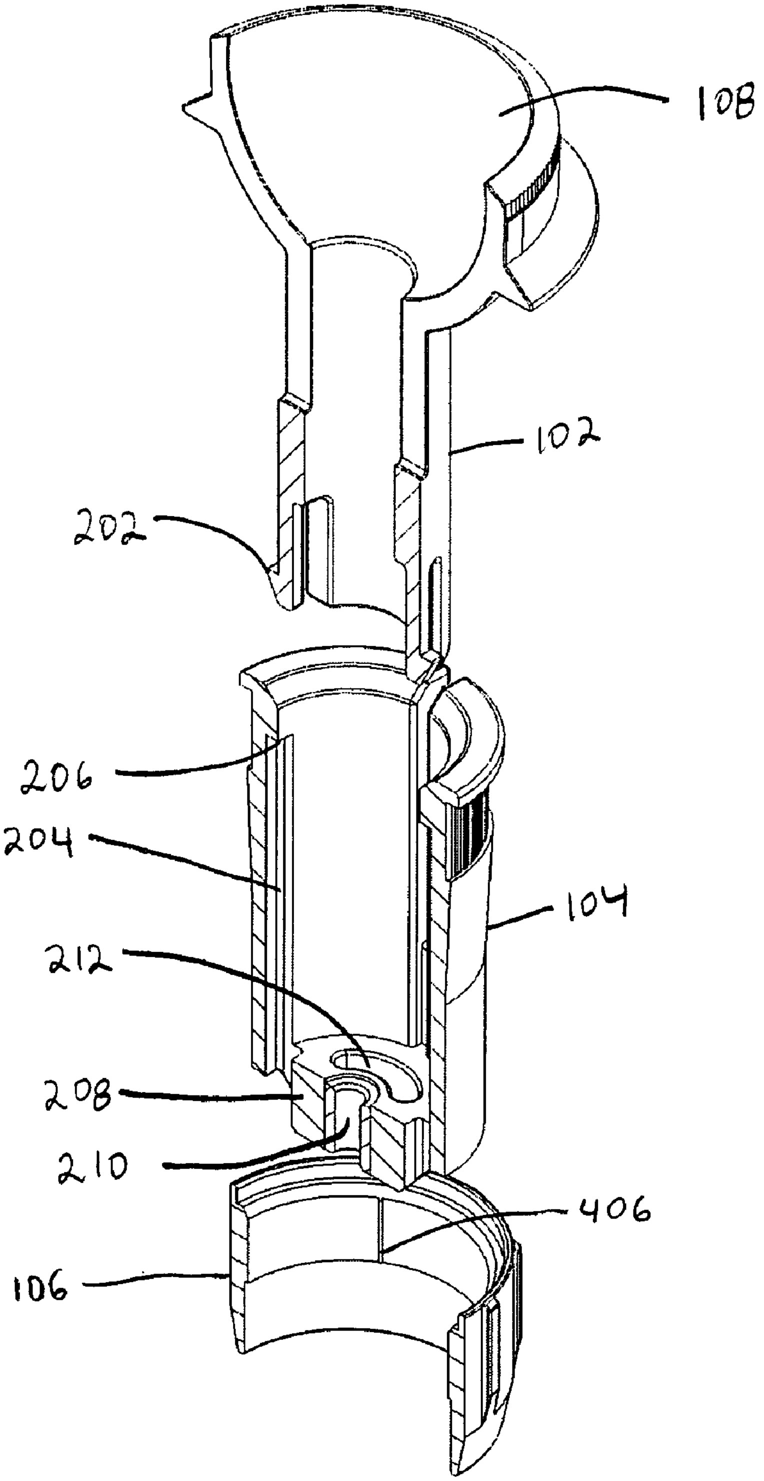
FIG. 2 illustrates a sectional view of the extension post mechanism illustrated in FIG. 1 according to one implementation of the invention.

FIG. 2 illustrates a sectional view of the extension post mechanism 100 illustrated in FIG. 1 according to one embodiment of the invention. One aspect of the extension post mechanism 100 may include one or more retention snap pins 202 as part of the extendable inner post 102 feature to secure the inner post 102 to the outer post sleeve 104. The outer post sleeve 104 includes corresponding retention slots 204 and retention stop 206. The retention snap pins 202 slide within the retention slots 204 and are stopped by the retention stops 206 once a maximum extension has been reached. This prevents the inner post 102 from separating from the outer post sleeve 104 when the lock ring 106 is loosened.

The outer post sleeve 104 may also be configured to be attached to a mounting mechanism. For instance, the outer post sleeve 104 may include a base 208 with an opening 210 which can serve to fasten the outer post sleeve to a mounting mechanism. In one implementation of the invention, the opening 210 may be threaded to be screwed on a fastener. Alternatively, the opening 210 may receive a threaded fitting which can be screwed on a fastener. In another embodiment of the invention, other fastening systems or mechanism may be used to couple the outer post sleeve 104 to a mounting mechanism without departing from the invention.

The base 208 may also include a second opening 212 that may serve as a passage to electrically conductive wires. For instance, the second opening 212 may permit electrical wires to run from through the outer post sleeve 104 and inner post 102 to an audio device mounted on the socket 108.

Figure 3:
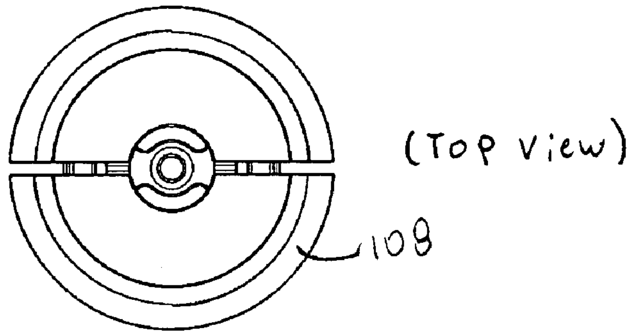
FIG. 3 illustrates a side view of the extension post mechanism illustrated in FIG. 1 according to one implementation of the invention.
Figure 3:
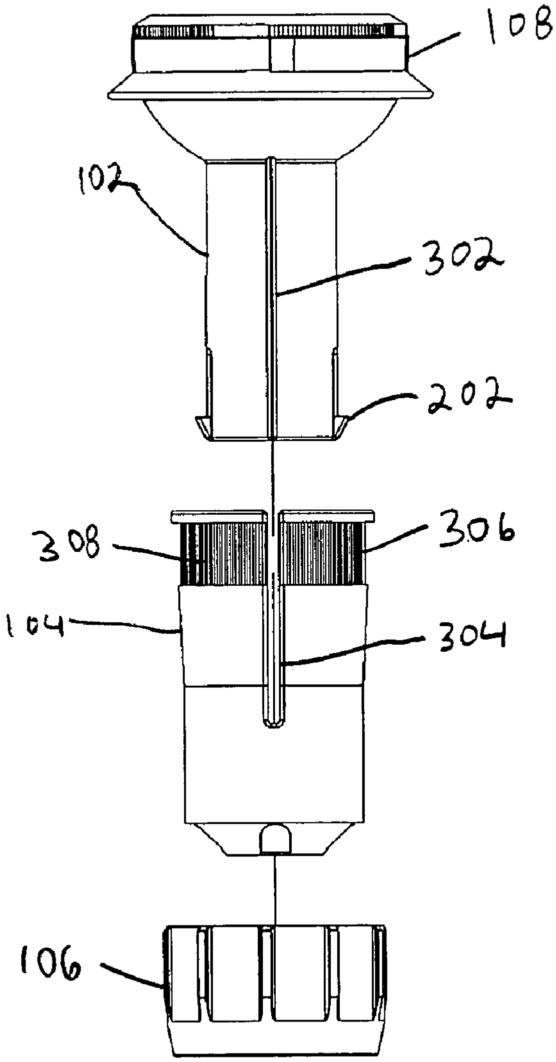

FIG. 3 illustrates a side view of the extension post mechanism 100 illustrated in FIG. 1 according to one embodiment of the invention. The extendable inner post 102 includes one or more anti-rotation ribs 302 which engage matching slots 304 in the outer post sleeve 104. While the anti-rotation ribs 302 may slide up or down within the slots 304, they restrict the rotation of the anti-rotation ribs 302. This prevents the unintended rotation of the extendable inner post 102 relative to the outer post sleeve 104.

The extendable inner post 102 may be secured at a desired position by tightening the post lock ring 106 around the upper neck 306 of the outer post sleeve 104. According to one aspect of the invention, the post lock ring 106 and outer post sleeve 104 include a ramp locking mechanism to tighten the lock ring 106 around the outer post sleeve neck 306 thereby securing the position of the inner post 102 relative to the outer post sleeve 104.

Figure 4:
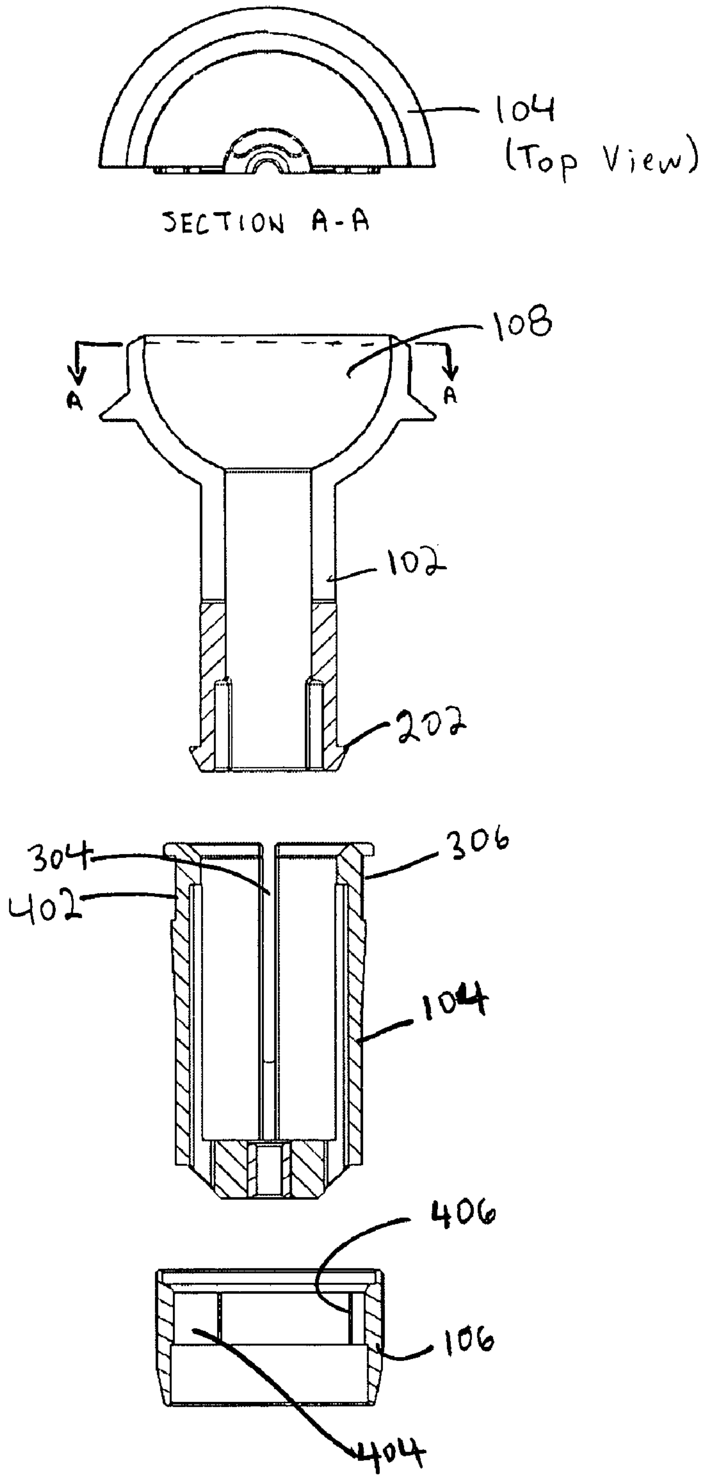
FIG. 4 illustrates a sectional view of the extension post mechanism illustrated in FIG. 1 according to one implementation of the invention.

FIG. 4 illustrates a sectional view of the extension post mechanism 100 of FIG. 1 according to one embodiment of the invention. The outer post sleeve 104 includes a retention slot 402 around the neck 306. The retention slot 402 also includes one or more ramps which gradually vary the diameter of the neck 306. That is, the retention slot 402 is not perfectly circular but rather includes portions around the retention slot 402 that gradually increase in diameter. These ramps serve to tighten the outer sleeve 104 around the inner post 102 when the lock ring 106 is rotated. The diameter of the outer sleeve neck 306 is allowed to tighten by the inward radial force exerted by the lock ring 106 and the slots 304 which permit the outer sleeve walls to flex inward.

The lock ring 106 includes an internal retention ring 404 that fits into the retention slot 402. The lock ring 106 also includes one or more protruding tensioning ribs 406 that slide against the tensioning ramps of the retention slot 402 to gradually increase the inward force exerted on the neck 306 of the outer sleeve 104. Once the lock ring 106 is tightened around the neck of the outer sleeve 104, loosening of the lock ring 106 is prevented by a plurality of tensioning lines or bumps 308 in FIG. 3 which create friction with the tensioning ribs 406.

Another aspect of the invention provides a method for angling an audio device (e.g., tweeter) that may be coupled to the socket 108, relative to its mounting 100, in such a way that it may be infinitely adjustable between its un-angled position, and a maximum angle (e.g., up to fifty degrees (50°)).

Figure 5:
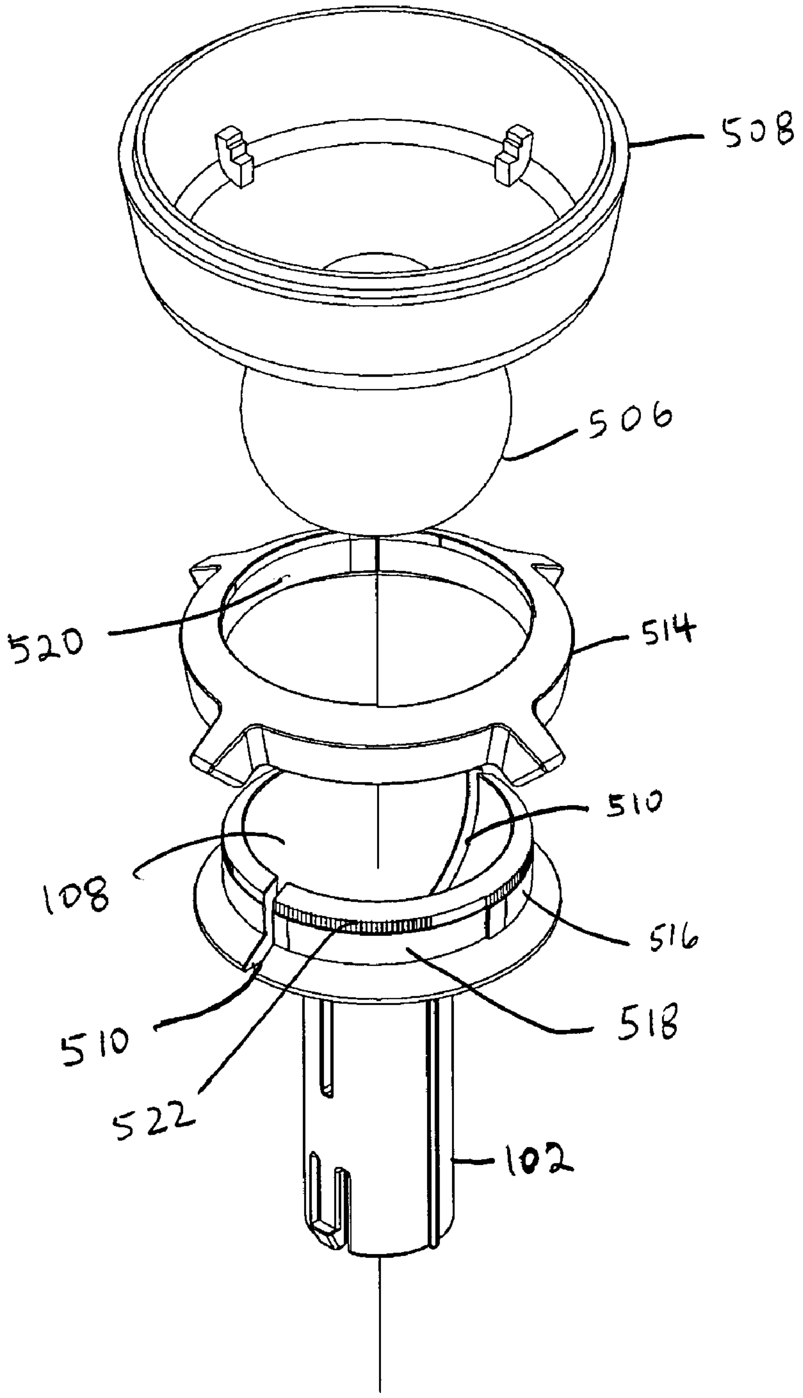
FIG. 5 illustrates a retaining and angling mechanism that may operate with an extension post mechanism according to one implementation of the invention.

FIG. 5 illustrates a retaining and angling mechanism that may operate with an extension post mechanism according to one implementation of the invention. One embodiment of the retaining and angling mechanism includes an extendable post 102 having a receiving socket 108, a rotating ball 506 that sits on the socket 108 in a ball-joint configuration, a device housing 508 that is coupled to the rotating ball 506 and a lock ring 514 to secure the rotating ball 506 to the socket 108.

According to one implementation of the invention, the socket 108 includes grooves or split lines 510 that permit it to expand and/or contract around the rotating ball 506. That is, the socket walls or edges 512 can flex outward when the rotating ball 506 is inserted or flex inward when the lock ring 514 is secured around the socket edge 512. In one implementation of the invention, the grooves or split lines extend to the inner post 502.

The socket 108 has a depth that is slightly more than the radius of the rotating ball 506. The rotating ball 506 may be pressed into the socket 108 so that its midpoint sits just below the socket edge 512. That is, the circumference of the rotating ball 506 within the socket 108 is larger than the circumference of the rotating ball outside of the socket 108. Thus, when an inward radial force is exerted around the socket edge 512, the rotating ball 506 is rotationally secured within the socket 108.

Once the rotating ball 506 is inserted into the socket 108 the lock ring 514 is slid over the socket 504 to rotationally secure the rotating ball 506.

Figure 6:
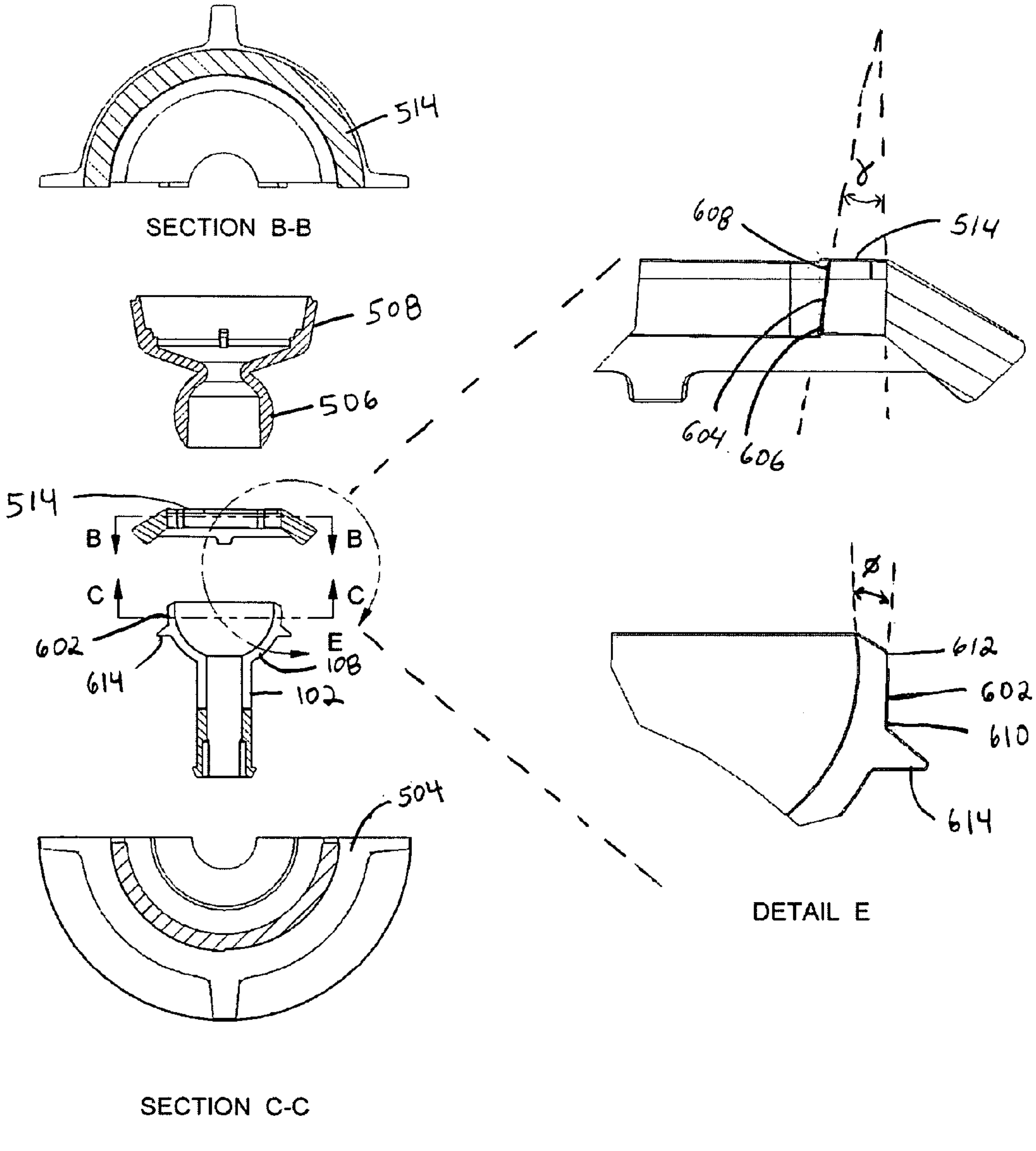
FIG. 6 is a sectional view of the retaining and angling mechanism in FIG. 5 according to one embodiment of the invention.

FIG. 6 is a sectional view of the retaining and angling mechanism in FIG. 5 according to one embodiment of the invention. In one implementation of the invention, a reverse angle retention arrangement is used to secure the lock ring around the socket neck 602. Such reverse angle retention system may be implemented by angling the interior wall 604 of the lock ring 514 outward as shown and angling the exterior wall of the socket neck 602 outward as shown. In particular, the diameter of the lower ring interior ring lock 606 may be slightly smaller than the diameter of the upper interior lock ring 608. Similarly, the diameter of the lower socket neck 610 may be smaller than the diameter of the upper socket neck 612. By making the diameter of the lower inner ring lock 606 smaller than the diameter of the upper socket neck 612, the lock ring is prevented from sliding off the socket neck 602. Since the walls of the socket 108 flex inwards and outwards, the smaller diameter of the inner ring lock 606 can be pressed passed the larger diameter of the upper socket neck 612.

The retention effect of the reverse angle retention system described above may be further improved by using tensioning ramps to tighten the rotating the lock ring 514 around the socket neck 602. According to one implementation of the invention, tension ramps 516 and 518 are formed along the circumference of the socket neck 602. Similar ramps are formed along the inner circumference of the lock ring 514. These tensioning ramps 516 and 520 are mating in nature, as the lock ring 514 is rotated (e.g., clockwise), they apply an inward force to the socket neck 602 which in turn applies an equal inward radial force upon the rotating ball 506. The inward radial force upon the rotating ball 506 ensures the retention of the rotating ball 506 in the socket 108, regardless of the ball's 506 rotational position.

Figure 7:
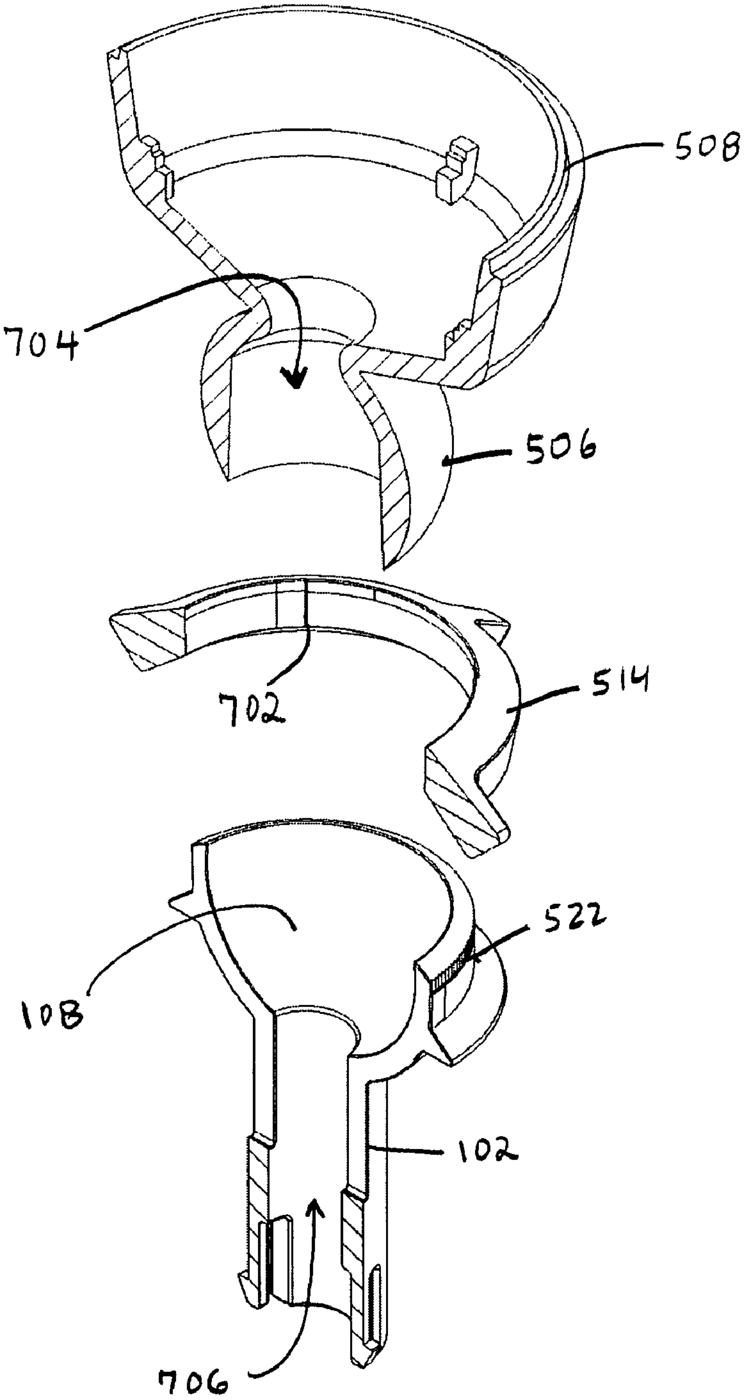
FIG. 7 illustrates a perspective sectional view of the reverse angle retention system of FIG. 5 according to one implementation of the invention.

FIG. 7 illustrates a perspective sectional view of the reverse angle retention system of FIG. 5 according to one implementation of the invention. The lock ring's 514 locking position is maintained by the interaction between lock ring tensioning ribs 702 and socket neck bumps 522.

According to one implementation of the reverse angle retention system, the socket 108 includes a ledge or tabs 614 along the outer surface of the socket 108 that stop the lock ring 514 from going past a desired position on the socket neck 602.

Another aspect of the invention provides a plurality of passages through which to pass wires to and/from an audio device mounted on the device housing 508. The device housing 508 and rotating ball 506 may define an opening 704 through which one or more wires may pass. Additionally, the extendable inner post 102 and socket 108 also define a passage 706 through which wires may pass to passage 704. In this manner, an audio device mounted on the device housing 508 may be electrically coupled to other devices.

When placed in the socket 108, the rotating ball 506 may be angled to a desired position. For instance, according to one implementation of the invention, the rotating ball may be angled up to fifty degrees relative to the extension mechanism 100. The rotating ball 506 may have a passage 704 with a sufficiently large opening such that, when the rotating ball is angled relative to the extension mechanism 100, the wires to the audio device passing through the passage 704 permit the rotating ball to angle up to fifty degrees.

In concert with the post extension mechanism, these features enable the placement of an in-wall or in-ceiling audio device (e.g., speaker, woofer, tweeter, audio transducer, etc.) in such a way so as to place the listener in a "direct on-axis" position with the audio device, even when the listener is listening from the opposite end of a room relative to the speakers mounting position. That is, by placing the audio device just below the surface of the ceiling and/or angling the audio device sufficiently, the sound dispersion axis of the audio device may reach a listener directly for better sound perception.

Figure 8:
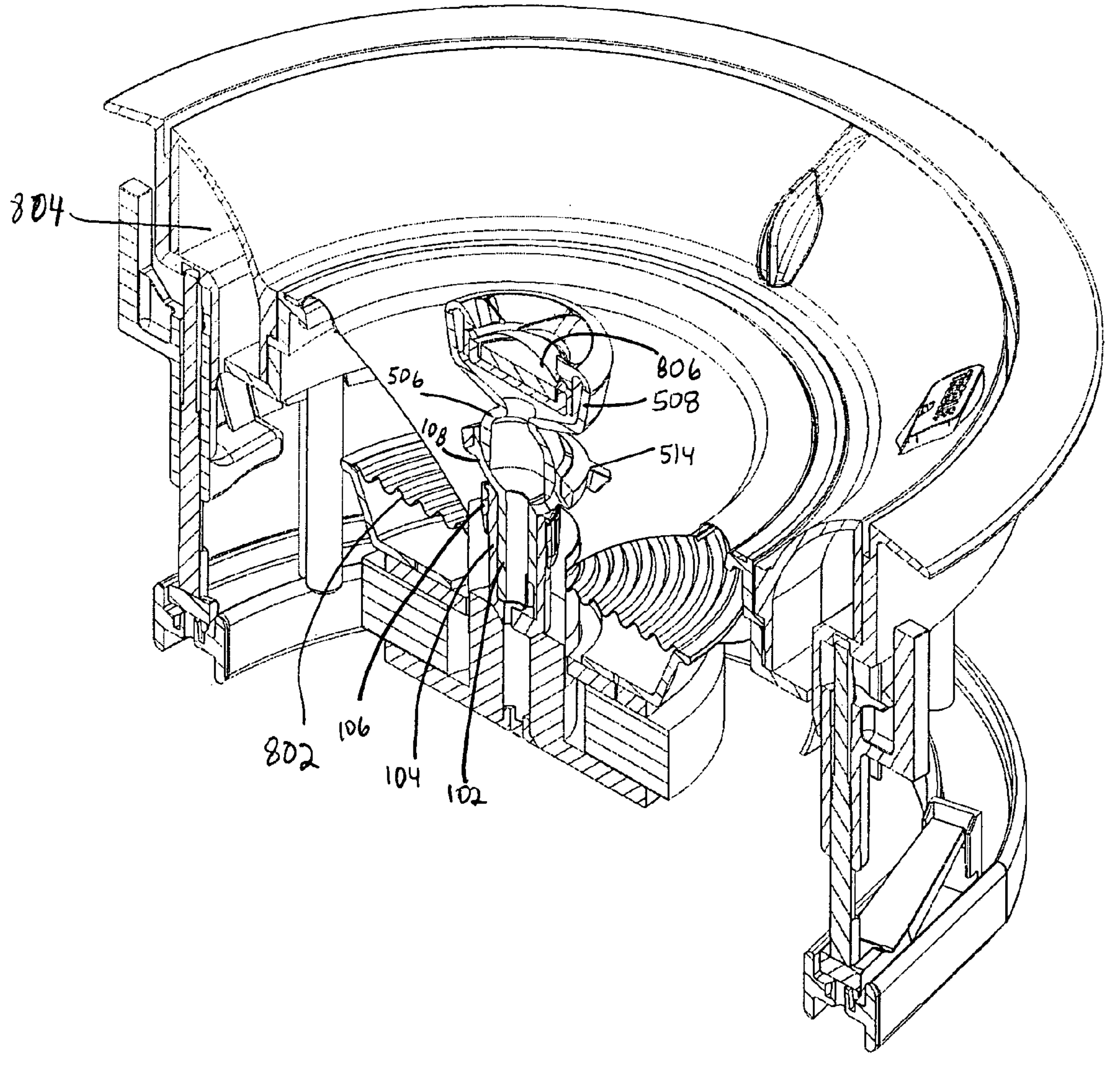
FIG. 8 illustrates a cross-sectional view of an audio device implementing an extendable post and angling system according to one embodiment of the invention.

FIG. 8 illustrates a cross-sectional view of an audio device implementing an extendable post and angling system according to one embodiment of the invention. A speaker device 802 may be mounted on a frame assembly 804. A sub-woofer 806 may be mounted on an extendable post system 102, 104, and 106 and on a angling socket assembly 108, 506, 508, and 514.

Figure 9:
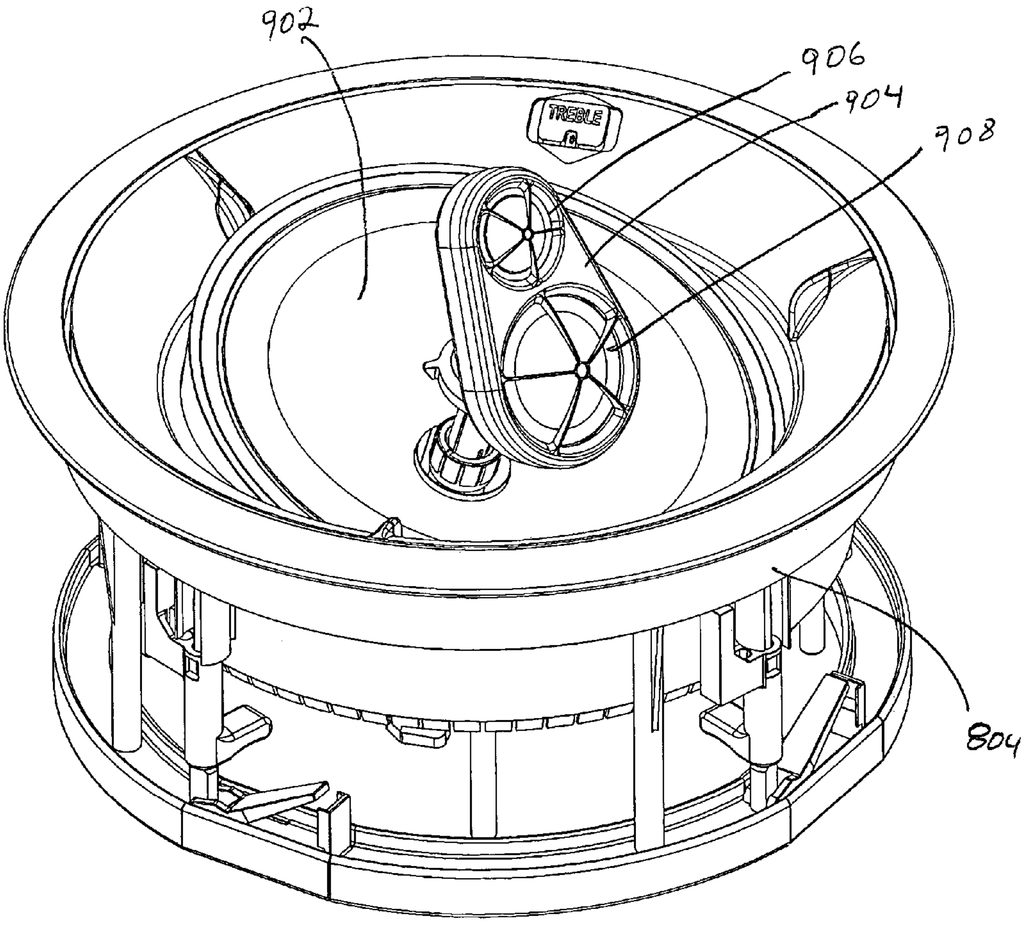
FIG. 9 illustrates a perspective view of an audio device having an extension post and the retaining and angling mechanism to hold two or more audio transducer devices according to one embodiment of the invention.

FIG. 9 illustrates a perspective view of an audio device system having an extension post and the retaining and angling mechanism to hold two or more audio transducer devices according to one embodiment of the invention. The frame assembly 804 may support an audio transducer device (e.g., speaker) 902, at an adjustable angle, while the extension post 102 and 104 and angling socket assembly 108, 506, 508, and 514 may secure a multiple-transducer housing 904. For example, the housing 904 may hold a tweeter 906 and sub-woofer 908 in one implementation of the invention. Other types of transducer devices may also be held by the housing 904. The housing 904 and transducer devices 906 and 908 may be angled and position as desired to achieve a desirable sound dispersion.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for mounting audio devices comprising
- a telescoping post mechanism including
  - an inner post having one or more anti-rotation ribs,
  - a ball-joint socket coupled to a first end of the inner post, the ball-joint socket to couple to an audio device,
  - an outer sleeve having a receiving first end and a mounting second end, the outer sleeve defining an inner passage to receive the inner post from the receiving first end, the outer sleeve including one or more slots for receiving the anti-rotation ribs, and
  - a first lock ring sized to fit around the circumference of the first end of outer sleeve, the first lock ring including one or more protruding tensioning ribs that rotationally act on tensioning ramps on the first end of the outer sleeve to tighten the first end of the outer sleeve around the inner post and secure the inner post at a desired position; and
  - an angling mechanism including
    - a rotating ball coupler sized to fit within the ball-joint socket, the rotating ball coupler capable of rotating within the ball-joint socket,
    - an audio device housing coupled to the rotating ball coupler,
    - a second lock ring sized to fit around a circumference of the ball-joint socket and tighten the ball-joint socket around the rotating ball, and
    - a reverse angle retention system between an inner circumference of the second lock ring and the outer circumference of the ball-joint socket to prevent the second lock ring from slipping off,
    - wherein in the reverse angle retention system a lower inner diameter of the second ring lock is smaller than an upper outer diameter of the ball-joint socket and an upper inner diameter of the second ring lock is larger than a lower outer diameter of the ball-joint socket.

2. The system of claim 1 wherein the rotating ball coupler is further capable of being angled up to approximately fifty degrees in any direction.

3. The system of claim 1 wherein the tensioning ramps on the first end of the outer sleeve ramp radially outward from the outer circumference of the outer sleeve.

4. The system of claim 1 wherein the ball-joint socket includes one or more grooves that permit the socket walls to flex inwards.

5. The system of claim 1 wherein the inner circumference of the ball-joint socket has a larger diameter than the inner post.

6. A system for mounting audio devices comprising:

a telescoping post mechanism including an inner post having one or more anti-rotation ribs, a ball-joint socket coupled to a first end of the inner post, the ball-joint socket to couple to an audio device, an outer sleeve having a receiving first end and a mounting second end, the outer sleeve defining an inner passage to receive the inner post from the receiving first end, the outer sleeve including one or more slots for receiving the anti-rotation ribs, and a first lock ring sized to fit around a circumference of the first end of outer sleeve, the first lock ring including one or more protruding tensioning ribs that rotationally act on tensioning ramps on the first end of the outer sleeve to tighten the first end of the outer sleeve around the inner post and secure the inner post at a desired position; and an angling mechanism including a rotating ball coupler sized to fit within the ball-joint socket, the rotating ball coupler capable of rotating within the ball-joint socket, an audio device housing coupled to the rotating ball coupler, a second lock ring sized to fit around a circumference of the ball-joint socket and tighten the ball-joint socket around the rotating ball, wherein the ball-joint socket includes one or more tensioning ramps along an outer circumference of the ball-joint socket, when the second lock ring is rotated around the circumference of the ball-joint socket, an inward radial force is exerted to secure the rotating ball coupler at a particular position, and the second lock ring includes one or more tensioning ribs and the ball-joint socket includes a plurality of friction bumps to keep the second lock ring from loosening once it is tightened.

7. The system of claim 6 wherein the second lock ring includes one or more tensioning ramps to exert an inward radial force on the one or more tensioning ramps along circumference of the ball-joint socket when the second lock ring is rotated.

8. The system of claim 6 wherein the one or more tensioning ramps on the ball-joint socket ramp radially outward from the outer circumference of the ball-joint socket.

9. The system of claim 7 wherein the one or more tensioning ramps on the second lock ring ramp radially inward from the inner circumference of the second lock ring.

* * * * *